J. P. FULGHUM.
Grain-Drill.
No. 66,578.  Patented July 9, 1867.
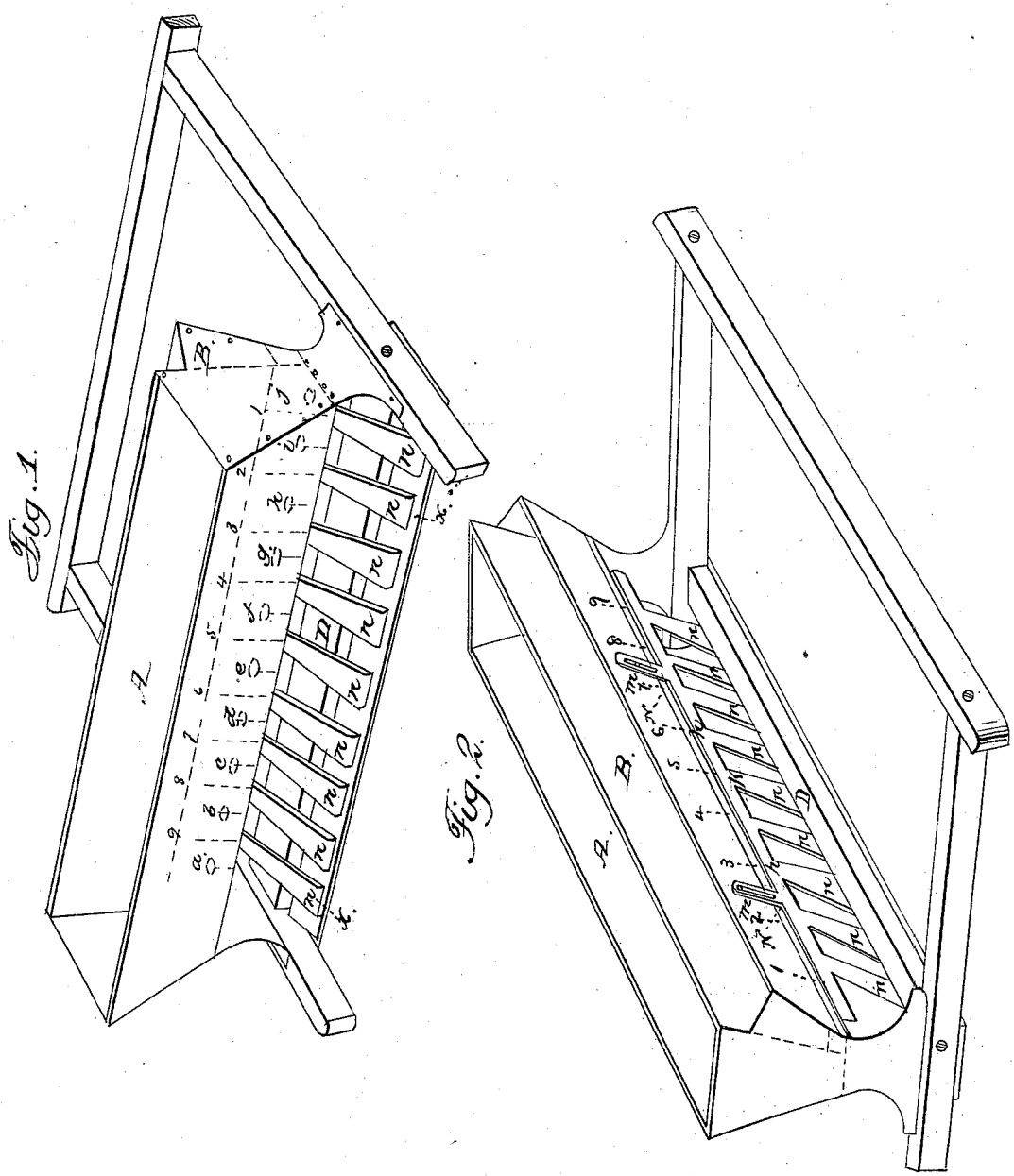
WITNESSES:
Joseph Ridge
G. W. Stegeman
INVENTOR:
Jesse P. Fulghum

United States Patent Office.

JESSE P. FULGHUM, OF MILTON, INDIANA.

Letters Patent No. 66,578, dated July 9, 1867.

IMPROVEMENT IN SEED-DRILLS.

*The Schedule referred to in these Letters Patent and making part of the same.*

TO ALL WHOM IT MAY CONCERN:

Be it known that I, JESSE P. FULGHUM, of Milton, in the county of Wayne, State of Indiana, have invented a new and useful Improvement in Seed-Drills; and I do hereby declare that the following is a full, clear, and exact description of the construction and operation of the same, reference being had to the annexed drawings, making a part of this specification, in which—

Figure 1 represents a rear view, with reference to the drill, and

Figure 2, a front view of the same.

Similar letters of reference in the different figures represent corresponding parts of the drill.

The nature of my invention consists in providing a combined grain and grass-seed drill with an adjustable deflecting rack by which means the grass-seed may be made to fall either in front of or behind the hoes or teeth.

To enable others skilled in the art to make and use my invention, I will proceed to describe it with reference to the drawings.

A represents the grain-hopper. The perforations in its bottom for the egress of the grain are indicated by the letters $a$ to $J$, inclusive, as shown in fig. 1. In front and attached to the grain-hopper is the grass-seed hopper B. Its perforations for the egress of the seed are indicated by the numerals 1 to 9, inclusive. K, fig. 2, represents the adjustable deflecting rack, composed of a series of spouts or chutes, $n\ n\ n$, &c., attached together by the horizontal bar $r\ r$. Extending at right angles from the bar, and on a line with the spouts or chutes, are projections N N slotted longitudinally. The rack is secured in front of hopper B by the screws $m\ m$ through the slotted projections, and by loosening the said screws the rack may be raised or lowered (the distance of the length of the slots) at pleasure. The spouts or chutes $n\ n\ n$, &c., are situated at intervals corresponding to the perforations in the bottom of hopper B. The position of the deflecting rack K is at an inclination corresponding to the front of hopper B, terminating the spout or chutes in a downward and backward direction. The rack may be lowered obliquely until it clears the bottom of hopper B, when the grass-seed are allowed to fall in front of the hoes or teeth. When it is desirable that the seed should fall behind the hoes or teeth the rack K is elevated sufficient to bring its top under the bottom of hopper B. The seed is then deflected down the spouts or chutes $n\ n\ n$, &c., and falls behind the hoes or teeth. The perforations in the bottom of hopper A being situated at intervals between the spouts or chutes $n\ n\ n$, &c., the sowing of grain and grass-seed does not interfere with each other.

Having thus fully described my invention, what I claim, and desire to secure by Letters Patent, is—

The adjustable deflecting rack K, secured either to the hopper B or any other part of the drill, (and made adjustable by means of the slotted projections N N and screws $m\ m$,) or their equivalents, substantially in the manner and for the purpose described.

JESSE P. FULGHUM.

Witnesses:
JOSEPH RIDGE,
SAM'L F. ESTELL.